(12) United States Patent
Nikolaevich (10) Patent No.: US 10,128,942 B2
(45) Date of Patent: Nov. 13, 2018

(54) METHOD OF TRANSMITTING AN OPTICAL DATA SIGNAL VIA A FIBER OPTICAL MEDIUM IN OPPOSITE DIRECTIONS AT THE SAME CARRIER WAVELENGTH

(71) Applicant: Sergeev Sergey Nikolaevich, Moscow (RU)

(72) Inventor: Sergeev Sergey Nikolaevich, Moscow (RU)

(*) Notice: Subject to any disclaimer, the term of this patent is extended or adjusted under 35 U.S.C. 154(b) by 104 days.

(21) Appl. No.: 15/344,337

(22) Filed: Nov. 4, 2016

(65) Prior Publication Data

US 2017/0054497 A1 Feb. 23, 2017

Related U.S. Application Data

(63) Continuation-in-part of application No. 14/359,126, filed as application No. PCT/RU2013/000690 on Aug. 8, 2013.

(30) Foreign Application Priority Data

Dec. 27, 2012 (RU) ................. 2012157134

(51) Int. Cl.
| | | |
|---|---|---|
| H04B 10/12 | (2006.01) | |
| H04B 10/08 | (2006.01) | |
| H04J 14/02 | (2006.01) | |
| H04B 10/079 | (2013.01) | |
| H04B 10/572 | (2013.01) | |
| H04B 10/25 | (2013.01) | |

(52) U.S. Cl.
CPC ... *H04B 10/07955* (2013.01); *H04B 10/2503* (2013.01); *H04B 10/572* (2013.01); *H04J 14/0221* (2013.01); *H04B 10/079* (2013.01); *H04B 10/25* (2013.01)

(58) Field of Classification Search
CPC .. H04B 10/25; H04B 10/2503; H04B 10/572; H04B 10/07; H04B 10/071; G01M 11/3109; H04J 14/02
USPC .......................................................... 398/141
See application file for complete search history.

(56) References Cited

U.S. PATENT DOCUMENTS

| | | | | | |
|---|---|---|---|---|---|
| 4,832,437 | A | * | 5/1989 | Kim | G02B 6/14 385/1 |
| 5,129,022 | A | * | 7/1992 | Marcus | G01D 5/268 385/47 |
| 5,164,588 | A | * | 11/1992 | Marcus | G01D 5/268 250/227.21 |
| 5,212,586 | A | * | 5/1993 | Van Delden | G02F 1/093 359/281 |
| 5,245,401 | A | * | 9/1993 | Tache | G01M 11/3109 356/73.1 |
| 5,365,335 | A | * | 11/1994 | Sorin | G01M 11/3172 250/227.19 |
| 5,373,386 | A | * | 12/1994 | Bolze | H04B 10/2503 398/161 |

(Continued)

*Primary Examiner* — M. R. Sedighian
*Assistant Examiner* — Abbas H Alagheband
(74) *Attorney, Agent, or Firm* — Preston Smirman; Smirman IP Law, PLLC (57) ABSTRACT

The described method relates to fiber optic communication engineering and can be used in fiber optic communication systems for creating several independent communication channels. One object of the method is to increase the utilization efficiency of the optic fibers by using optical signals transmitted in opposite directions at one wavelength.

18 Claims, 3 Drawing Sheets

(56) References Cited

U.S. PATENT DOCUMENTS

| | | | | |
|---|---|---|---|---|
| 6,002,501 A * | 12/1999 | Smith | G01M 3/28 | 356/44 |
| 6,501,551 B1 * | 12/2002 | Tearney | A61B 1/00096 | 356/477 |
| 6,606,430 B2 * | 8/2003 | Bartur | G02B 6/4202 | 385/24 |
| 6,652,158 B2 * | 11/2003 | Bartur | G02B 6/4202 | 385/88 |
| 6,947,857 B2 * | 9/2005 | Jones | H04L 43/50 | 702/65 |
| 7,046,349 B2 * | 5/2006 | Everall | G01D 5/35383 | 356/73.1 |
| 7,110,098 B2 * | 9/2006 | Peerlings | G01M 11/3109 | 356/73.1 |
| 7,272,321 B1 * | 9/2007 | Kuo | H04J 14/02 | 398/100 |
| 7,715,664 B1 * | 5/2010 | Shou | G02B 6/4208 | 385/11 |
| 8,457,489 B2 * | 6/2013 | Eiselt | H04B 10/272 | 398/32 |
| 8,655,167 B1 * | 2/2014 | Lam | H04B 10/071 | 398/16 |
| 8,971,721 B2 * | 3/2015 | Mazzone | H04B 10/516 | 398/140 |
| 2002/0028049 A1 * | 3/2002 | Bartur | G02B 6/4202 | 385/92 |
| 2002/0061163 A1 * | 5/2002 | Bartur | G02B 6/4202 | 385/24 |
| 2003/0113118 A1 * | 6/2003 | Bartur | H04B 10/0771 | 398/139 |
| 2003/0142929 A1 * | 7/2003 | Bartur | G02B 6/4214 | 385/92 |
| 2003/0147601 A1 * | 8/2003 | Bartur | G02B 6/4214 | 385/92 |
| 2003/0180045 A1 * | 9/2003 | Tajima | H04B 10/2503 | 398/42 |
| 2004/0044489 A1 * | 3/2004 | Jones | H04L 43/50 | 702/79 |
| 2004/0113056 A1 * | 6/2004 | Everall | G01D 5/35383 | 250/227.23 |
| 2005/0201761 A1 * | 9/2005 | Bartur | H04B 10/071 | 398/197 |
| 2007/0297801 A1 * | 12/2007 | Mostert | H04B 10/27 | 398/81 |
| 2008/0131128 A1 * | 6/2008 | Ota | H04J 14/0201 | 398/79 |
| 2008/0165348 A1 * | 7/2008 | Kim | G01M 11/333 | 356/73.1 |
| 2011/0243559 A1 * | 10/2011 | Grobe | H04B 10/2916 | 398/58 |
| 2012/0128359 A1 * | 5/2012 | Mazzone | H04B 10/2587 | 398/67 |
| 2012/0203957 A1 * | 8/2012 | Schuette | G11C 7/1081 | 711/103 |
| 2014/0016926 A1 * | 1/2014 | Soto | H04B 10/0775 | 398/16 |
| 2014/0086575 A1 * | 3/2014 | Fukushi | H04B 10/07 | 398/26 |
| 2014/0104599 A1 * | 4/2014 | Lee | G01M 11/3145 | 356/73.1 |

* cited by examiner

METHOD OF TRANSMITTING AN OPTICAL DATA SIGNAL VIA A FIBER OPTICAL MEDIUM IN OPPOSITE DIRECTIONS AT THE SAME CARRIER WAVELENGTH

CROSS REFERENCE TO RELATED APPLICATION

The instant application is a continuation-in-part of U.S. patent application Ser. No. 14/359,126, filed May 19, 2014, pending, which is a National Stage of PCT International Patent Application Serial No. PCT/RU2013/000690, filed Aug. 8, 2013, which claims priority to Russian Patent Application Serial No. 2012157134, filed Dec. 27, 2012, the entire specifications of all of which are expressly incorporated herein by reference.

FIELD OF THE INVENTION

The present invention generally relates to methods for fiber optic communication engineering, and more specifically, to methods for fiber optic communication engineering that can be used in fiber optic communication systems for creating communication channels.

BACKGROUND OF THE INVENTION

The use of SFP+ modules for creating high speed duplex channels with up to 10 Gbps data rates is generally known (e.g., see http://en.wikipedia.org/wiki/Small_form-factor_pluggable_transceiver#cite_note-spec-11, SFF-8431). For example, wavelength division multiplexing (WDM) SFP+modules are generally intended for creating a duplex communication channel in a single fiber.

Disadvantages of this method are the low efficiency use of the fibers and the impossibility to simultaneously connect other devices to the same fibers.

The use of optical circulators for the transmission of two data streams in different directions via the same fiber and at the same wavelength is also generally known (e.g., see U.S. Pat. No. 5,212,586). An optical circulator is a fully passive device, the operation principle of which is based on the effect of nonreciprocal rotation of polarization planes (i.e., the so-called Faraday Effect). Two mutually orthogonal polarized planes are used for data transmission. One of them conducts the optical signal in one direction, and the other one, in the opposite direction.

Disadvantages of this method are the relatively high cost determined by the price of the optical circulators and the low efficient use of the fibers (e.g., this efficiency is limited by the transparency windows of the optical circulators).

SUMMARY OF THE INVENTION

One object of the methods provided herein is to increase the utilization efficiency of the optic fibers by using optical signals transmitted in opposite directions at one wavelength.

In accordance with one embodiment of the present invention, a method is provided for transmitting an optical data signal via a fiber optical medium in opposite directions at the same carrier wavelength comprising using a fiber-optical line terminated with transparent bidirectional signal dividers intended for the input/output of optical data signals to/from the fiber-optical line, an optical receiver and an optical transmitter, optically connected to the fiber-optical line via the transparent bidirectional signal dividers at opposite sides, comprising:

measuring or calculating a value of an overall reflected signal power reaching the input of the optical receiver for a specific optical communication system;

comparing the value with a selected maximum noise power acceptable for data signal extraction by the optical receiver; and lowering the overall power of the reflected signal reaching the input of the optical receiver to a selected level that is acceptable for separating a target optical signal from the overall optical signal reaching the input of the optical receiver by excluding highly reflecting elements in a path of the optical data signal between the optical transmitter and the optical receiver, and, as a result, the transmission of the optical data signal is achieved in the opposite directions at the same carrier wavelength for the specific optical communication system.

In accordance with one aspect of this embodiment, the steps are performed as a preliminary step before implementation of a further transmission.

In accordance with one aspect of this embodiment, the steps are performed during the transmission of the optical data signal.

In accordance with one aspect of this embodiment, the fiber-optical line comprises passive optical elements.

In accordance with one aspect of this embodiment, the method is used in combination with a wavelength division multiplexing method.

In accordance with one aspect of this embodiment, the wavelength division multiplexing method is selected from wavelength division multiplexing, coarse wavelength division multiplexing, and dense wavelength division multiplexing.

In accordance with one aspect of this embodiment, the fiber is homogeneous.

In accordance with one aspect of this embodiment, the fiber-optical medium comprises a plurality of wavelength bands, wherein transmission of at least one wavelength band is achieved in two opposite directions.

In accordance with one aspect of this embodiment, a power of a signal reflected from an opposite end of the specific optical communication system is neglected in the calculation of the overall reflected signal power.

In accordance with one aspect of this embodiment, the transmitter and the receiver operate at the same carrier wavelength.

In accordance with another embodiment of the present invention, a method is provided for transmitting an optical data signal via a fiber optical medium in opposite directions at a same carrier wavelength comprising using a fiber-optical line, terminated with transparent bidirectional signal dividers intended for the input/output of optical data signals to/from the fiber-optical line, an optical receiver and an optical transmitter, optically connected to the fiber-optical line via the transparent bidirectional signal dividers at opposite sides, comprising:

measuring or calculating a value of an overall reflected signal power reaching the input of the optical receiver for a specific optical communication system;

comparing the value with a selected maximum noise power acceptable for data signal extraction by the optical receiver; and lowering the overall power of the reflected signal reaching the input of the optical receiver to a selected level that is acceptable for separating a target optical signal from the overall optical signal reaching the input of the optical receiver by replacing highly reflecting elements in a path of the optical signal with lower reflecting elements, and, as a result, the transmission of the optical data signal is achieved in the opposite directions at the same carrier wavelength for the specific optical communication system.

In accordance with one aspect of this embodiment, the steps are performed as a preliminary step before implementation of a further transmission.

In accordance with one aspect of this embodiment, the steps are performed during the transmission of the optical data signal.

In accordance with one aspect of this embodiment, the fiber-optical line comprises passive optical elements.

In accordance with one aspect of this embodiment, the method is used in combination with a wavelength division multiplexing method.

In accordance with one aspect of this embodiment, the wavelength division multiplexing method is selected from wavelength division multiplexing, coarse wavelength division multiplexing, and dense wavelength division multiplexing.

In accordance with one aspect of this embodiment, the fiber is homogeneous.

In accordance with one aspect of this embodiment, the fiber-optical medium comprises a plurality of wavelength bands, wherein transmission of at least one wavelength band is achieved in two opposite directions.

In accordance with one aspect of this embodiment, a power of a signal reflected from an opposite end of the specific optical communication system is neglected in the calculation of the overall reflected signal power.

In accordance with one aspect of this embodiment, the transmitter and the receiver operate at the same carrier wavelength.

In accordance with still another embodiment of the present invention, a method is provided for transmitting an optical data signal via a fiber optical medium in opposite directions at a same carrier wavelength comprising using a fiber-optical line, terminated with transparent bidirectional signal dividers intended for the input/output of optical data signals to/from the fiber-optical line, an optical receiver and an optical transmitter, optically connected to the fiber-optical line via the transparent bidirectional signal dividers at opposite sides, comprising:

measuring or calculating a value of an overall reflected signal power reaching the input of the optical receiver for a specific optical communication system;

comparing the value with a selected maximum noise power acceptable for data signal extraction by the optical receiver; and lowering the overall power of the reflected signal reaching the input of the optical receiver to a selected level that is acceptable for separating a target optical signal from the overall optical signal reaching the input of the optical receiver by redistributing highly reflecting elements in a path of the optical signal between the optical transmitter and the optical receiver, and, as a result, the transmission of the optical data signal is achieved in the opposite directions at the same carrier wavelength for the specific optical communication system.

In accordance with one aspect of this embodiment, the steps are performed as a preliminary step before implementation of a further transmission.

In accordance with one aspect of this embodiment, the steps are performed during the transmission of the optical data signal.

In accordance with one aspect of this embodiment, the fiber-optical line comprises passive optical elements.

In accordance with one aspect of this embodiment, the method is used in combination with a wavelength division multiplexing method.

In accordance with one aspect of this embodiment, the wavelength division multiplexing method is selected from wavelength division multiplexing, coarse wavelength division multiplexing, and dense wavelength division multiplexing.

In accordance with one aspect of this embodiment, the fiber is homogeneous.

In accordance with one aspect of this embodiment, the fiber-optical medium comprises a plurality of wavelength bands, wherein transmission of at least one wavelength band is achieved in two opposite directions.

In accordance with one aspect of this embodiment, a power of a signal reflected from an opposite end of the specific optical communication system is neglected in the calculation of the overall reflected signal power.

In accordance with one aspect of this embodiment, the transmitter and the receiver operate at the same carrier wavelength.

Further areas of applicability of the present invention will become apparent from the detailed description provided hereinafter. It should be understood that the detailed description and specific examples, while indicating the preferred embodiment of the present invention, are intended for purposes of illustration only and are not intended to limit the scope of the present invention.

BRIEF DESCRIPTION OF THE DRAWINGS

Other advantages of the present invention will be readily appreciated as the same becomes better understood by reference to the following detailed description when considered in connection with the accompanying drawings wherein.

The same reference numerals refer to the same parts throughout the various Figures.

DETAILED DESCRIPTION OF THE INVENTION

The following description of the preferred embodiment(s) is merely exemplary in nature and is in no way intended to limit the present invention, or uses.

Figure 1:
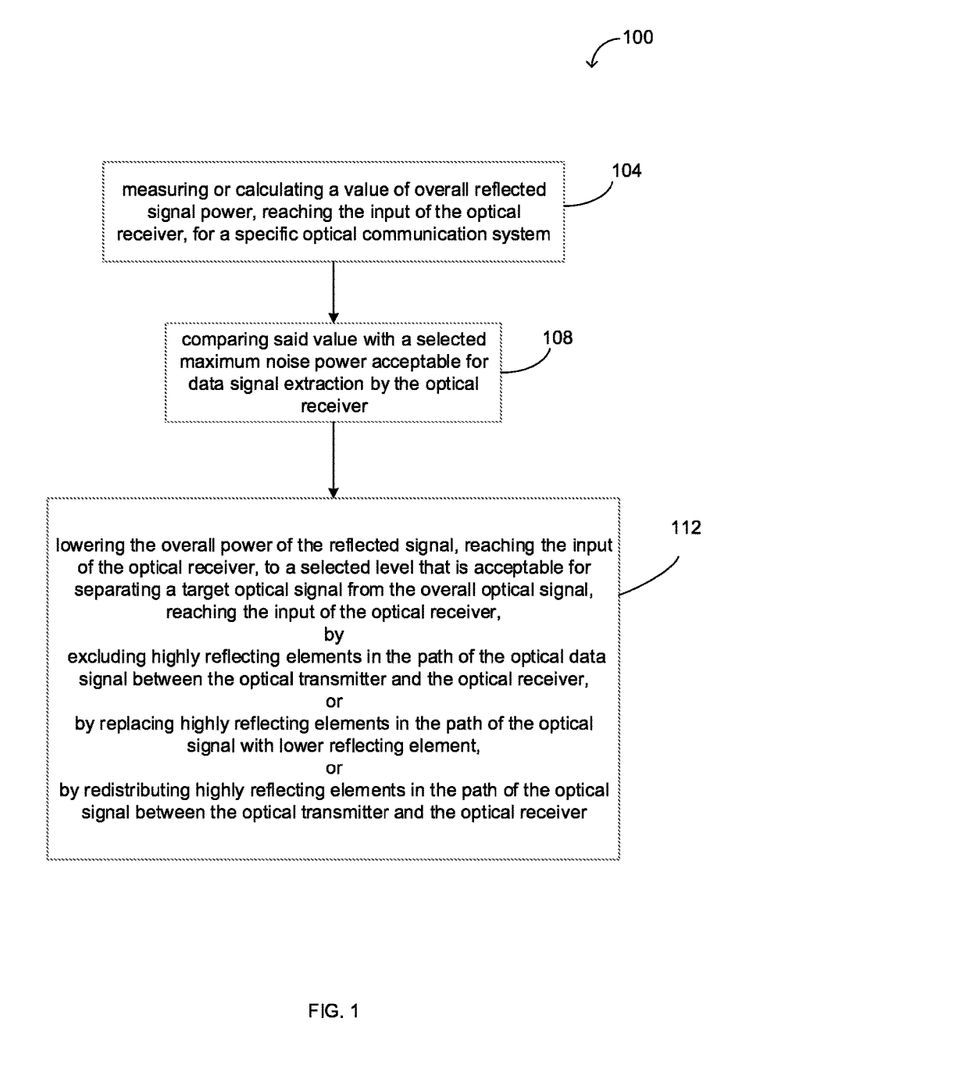
FIG. 1 shows a flow chart diagram illustrating an exemplary method of transmitting optical data signal via a fiber optic medium, in accordance with one embodiment of the present invention.

FIG. 1 is a flow chart diagram illustrating an exemplary embodiment of a method (100) of transmitting optical data signal via a fiber optic medium. It is suggested to achieve the objective using the method of transmitting an optical data signal via a fiber optical medium in opposite directions at the same carrier wavelength, an embodiment of which comprises the use of a fiber-optical line which may comprise passive optical elements and is terminated with transparent bidirectional signal dividers intended for the input/output of data signals to/from the fiber-optical line, wherein preliminarily or during the implementation of the method, the overall reflected signal power reaching the input of the optical receiver is measured or calculated for a specific optical communication system (e.g., see step 104), the value is compared with the maximum noise power acceptable for data signal extraction by the receiver (e.g., see step 108), and then, by excluding and/or redistributing highly reflecting elements in the path of the optical signal between the transmitter and the receiver, or by replacing the elements for lower reflecting ones, the overall power of the reflected signal reaching the input of the optical receiver is lowered to a level that is acceptable for separating the target optical signal from the overall optical signal reaching the input of the optical receiver (e.g., see step 112) and, as a result, the transmission of the optical signal is achieved in the opposite directions at the same carrier wavelength for a specific fiber-optical communication system.

The existing schemes of creating duplex channels require either two fibers or two wavelengths for signal receipt and transmission. However, these methods are not efficient because to provide a duplex communication channel requires a large quantity of resources that are limited (e.g., optic fiber and spectral band). For example, standard CWDM systems allow creating only 8 duplex channels per one fiber using these schemes.

The method provided herein does not require using any techniques of selective division of signals (e.g., by wavelength or polarization) for the division of directions and extends their applicability for further signal multiplexing.

Also, the creation of a duplex channel using this method will not produce any four-wave mixing interference because the channel will only use one carrier instead of two as in conventional methods.

Furthermore, this method fundamentally changes the scheme of connecting the spectral multiplexing elements to the optic fiber, thus allowing the creation of high-speed distributed single fiber communication networks in addition to the conventional point-to-point scheme.

The use of this method in combination with wavelength division multiplexing methods (e.g., WDM, CWDM, dense wavelength division multiplexing (DWDM) and/or the like) increases the utilization efficiency of optic fibers twofold, improves the reliability of the communication channels created with this method and lowers channel cost by significantly reducing the required quantity of passive wavelength division multiplexing elements.

Utilization results (e.g., depending on wavelength division multiplexing method used) are shown in Table I, below:

TABLE I

|  | Without DLFW and WDM | DLFW without WDM | WDM without DLFW | DLFW and WDM |
|---|---|---|---|---|
| Optic Fiber Utilization Efficiency Gain | 1 | 2 times | 8 times | 16 times |
| Optic Communication Channel Reliability Gain | 1 | 1.6 times | 1 times | 1.8 times |
| Channel Creating Cost Reduction (Optic Fiber and Passive Elements) | 1 | 2 times | 6 times | 15 times |
| Creation of Distributed Channels in a Single Fiber | no | no | limited | yes |

Note:
this table presents a comparison with conventional wavelength division multiplexing (WDM) method for a single fiber, e.g., 8-channel CWDM.

The method was tested in an operator's network during 3 years and proved to be efficient.

The basis for applying this method was the assumption that the overall power of reflected signal produced in fiber during the sending of an optical signal determined by the physical properties of a homogeneous fiber having standard parameters is negligible.

To assess the level of the reflected signal in a homogeneous fiber, we conducted a number of experiments aiming at measuring the parameters of reflected signals at the radiation input point in a sufficiently long homogeneous fiber.

Experimental results for main standard types of single-mode fiber showed that the reflected signal level is −55 to −70 dB.

Estimates suggest that for a standard single-mode fiber aperture the reflected signal level in a fiber of the maximum practical length cannot exceed −55 dB.

The results of calculations and measurements suggest the following:

The largest part of the reflected signal power received at the input of an optical communication system during the sending of an optical signal is produced at highly reflective points of the fiber-optical medium whereas the percentage of return radiation power determined by the physical properties of a homogeneous fiber having standard parameters is negligible.

The highly reflective points of communication systems (hereinafter, reflecting elements) can be, for example, connectors and introduced passive optical elements (e.g., attenuators, coarse wavelength division multiplexing (CWDM) components and/or the like).

Thus, to transmit an optical signal of the same wavelength via one single-mode fiber in opposite directions, it is sufficient to have the reflected signal (e.g., noise) at the receiver input generated by the reflecting elements of the communication system sufficiently low for reliable extraction of the data signal.

The calculation model used comprises:
an optical transmitter;
an optical receiver;
any bidirectional (e.g., transparent) signal coupling/splitting device (e.g., an optical splitter/coupler);
a fiber optical medium which may comprise other passive optical components; and
reflecting elements which may be, for example, couplers/splitters, wavelength division multiplexing elements, connectors and/or the like.

For this scheme, the level of signal reflected inside the fiber optical medium is the main and greatest contribution to the overall noise and it should be lower than the minimum acceptable noise level of the optical receiver.

During designing of DLFW channels and/or their creation in existing communication systems as per the method provided herein, one should primarily calculate the overall power of the reflected signal coming to the input of the optical receiver, generated by all the reflecting elements occurring in the path of the transmitter signal.

The overall power $P_{ref}$ of the reflected signal at the input of the receiver is equal to the sum of the powers of the reflected signals reaching the input of the receiver from each of the reflecting elements occurring in the path of the signal.

For a scheme comprising n reflecting elements, $$P_{ref} = \sum_{i=1}^{n} P_{ref\_i}, W,$$

where $P_{ref}$ is the overall power of the reflected signal reaching the input of the optical receiver and $P_{ref\_i}$ is the power of the reflected signal reaching the input of the receiver from the $i^{th}$ reflecting element.

The optical power $P_{ref\_i}$ coming to the input of the receiver from the $i^{th}$ reflecting element is calculated based on the logarithmic power level of the $i^{th}$ reflecting element, $p_{ref\_i}$:

$$P_{ref\_i} = 10^{\frac{P_{ref\_i}}{10}}, dBW,$$

which, in turn, is calculated as follows:

$$p_{ref\_i} = p_{tr} - A_i - A_{ref\_i} - A_{ret\_1}, dBW,$$

where $p_{tr}$ is the transmitter signal level, dBW, $A_i$ is the optical loss between the close end transmitter and the $i^{th}$ reflecting element, dB, $A_{ref\_i}$ is the return loss of the $i^{th}$ reflecting element, dB (as per the reflecting element specifications), and $A_{ret\_i}$ is the inverse direction optical loss between the $i^{th}$ reflecting element and the close end receiver, dB.

Then, $$P_{ref\_i} = 10^{\frac{p_{tr} - A_i - A_{ref\_i} - A_{ret\_i}}{10}}, W,$$

and hence $$P_{ref} = \sum_{i=1}^{n} 10^{\frac{p_{tr} - A_i - A_{ref\_i} - A_{ret\_i}}{10}}, W,$$

$$P_{ref} = 10^{\frac{p_{tr}}{10}} \sum_{i=1}^{n} 10^{\frac{-A_i - A_{ref\_i} - A_{ret\_i}}{10}}, W,$$

The logarithmic level of the overall reflected signal at the input of the receiver is $$p_{ref} = 10 lg P_{ref}, dBW, \text{ or}$$

$$p_{ref} = p_{tr} + 10 lg \sum_{i=1}^{n} 10^{\frac{-A_i - A_{ref\_i} - A_{ret\_i}}{10}}, dBW.$$

The following assumptions are made for the calculation of the noise at the receiver input:

(1) the power of the signal reflected from the opposite end is considered negligible taking into account the large loss in its path (e.g., equal to double line loss). For example, for a system with 15 dB loss (e.g., taking into account the losses at the splitters) and 16 dB reflection loss at mechanical connections, the power level of the signal reflected from the opposite end and coming to the input of the optical receiver is −46 dBW (e.g., if the transmitting power level is 0 dBW) while the sensitivity of the receivers used in systems with this level of loss is at least −26 Dbw;

(2) the power of secondary order reflected signal noise at the receiver input (e.g., reflections from reflections) is negligible. Calculations suggest that the secondary order reflected signal noise power level at the receiver input is by 60 dB or more lower than the overall noise power of first order reflected signals; and (3) the signal reflection power level in a homogeneous fiber is negligible (e.g., −55 dB).

The overall noise power level at the receiver input caused by the above or other reasons is considered negligible and is not taken into account.

The calculated power level $p_{n\_ref}$ of the reflected signal at the receiver input is compared with the maximum acceptable noise of the receiver $p_{max\_n\_rec}$ shown in the equipment specifications (e.g., typically −35 to −40 dB) with a 3 dB safety margin (e.g., 50%) for other types of noise (e.g., including far end reflections, reflection in the homogeneous fiber and noises coming from adjacent CWDM channels).

The requirement is as follows:

$$p_{max\_n\_rec} > p_{ref} + 3 \text{ dB}.$$

Furthermore, if the equipment specifications define the minimum acceptable logarithmic signal-to-noise ratio at the receiver input ($p_{min\_snr}$, dB), then:

$$p_{min\_snr} > p_{rec} - p_{ref} - 3 \text{ dB},$$

where $p_{rec}$ is the effective level of the signal from the opposite terminal transmitter received at the receiver input.

The above conditions should be satisfied for all the devices involved in the transmission of the data signal. All measurements and calculations are made for the required wavelength.

Based on the results of analysis and depending on the element composition of the fiber optical medium, by excluding and/or redistributing highly reflecting elements in the path of the optical signal between the transmitter and the receiver, or by replacing the elements for lower reflecting ones, the overall power of the optical signal reaching the input of the optical receiver is lowered to a level that is acceptable for extracting the useful data signal from the overall optical signal reaching the input of the optical receiver and, consequently, the transmission of the optical signal is achieved in the opposite directions at the same wavelength for a specific fiber-optical communication system.

This scheme provides for stable operation of the channels either in systems with wavelength division multiplexing or without it, and the type of wavelength division multiplexing used is not critical (e.g., WDM, CWDM, DWDM, HDWDM).

This scheme can be implemented either without wavelength division multiplexing or with additional wavelength division multiplexing (e.g., WDM, CWDM, DWDM).

In one embodiment of the scheme according to this method which can be implemented commercially, n duplex channels are created in one fiber optical medium using n wavelength bands, wherein only one optical band is used both for the receipt and for the transmission of a signal in one channel of the fiber optical medium.

The functions of the units and elements of the scheme are as follows:

Optical transmitter: generates a modulated optical data signal at the carrier wavelength dedicated for the specific channel (e.g., an active element);

Optical receiver: receives and processes the modulated optical data signal at the carrier wavelength dedicated for the specific channel (e.g., an active element);

Dual direction (e.g., transparent) coupler/splitter: dual direction (e.g., transparent) coupling/splitting device that joints/splits optical transmission and receipt channels in space to ensure non-selective (e.g., without wavelength division) optical signal splitting (e.g., a passive element);

Fiber optical line comprising at least one optical fiber; and

Wave multiplexer or OADM component: wavelength division multiplexer or component that allows transmitting multiple optical signals at different wavelengths via one fiber (e.g., a passive element).

The scheme operates as follows:

The optical transmitter generates a modulated optical data signal at the carrier wavelength dedicated for the specific channel. The signal then comes to one of the outputs of the bi-directional (e.g., transparent) coupler drop-splitter and further to the bi-directional OADM through which the received and the transmitted signals of the channel are sent. Then the signal propagates via the single fiber optical line together with the signals of other channels having different carrier wavelengths. At the output of the fiber optical line the required channel is separated from the other channel signals by the OADM component and fed to the common input of the bidirectional (e.g., transparent) coupler/splitter.

The signal reaching the coupler/splitter is split in two. One part of the signal is fed to the laser insulator and attenuated, and the signal of the other output comes to the optical receiver which processes the signal.

All the passive elements of the fiber-optic communication system should ensure the simultaneous transmission of the signals in two directions. If this scheme is used in an optical system with wavelength division multiplexing, all the couplers/splitters are installed beyond the grouped signal propagation range and therefore add losses to the signal of only one channel rather than to the entire system.

This system also allows transmitting signals from different channels in opposite directions at the same wavelength and hence further increasing the band density of the existing WDM channels.

For measuring the reflected signal level at the input of the receiver it is sufficient to measure the level of the signal reaching the input of the receiver when the close end transmitter is on and the far end transmitter is off.

Below are results of practical testing of the scheme. The tests of the embodiment of the method for creating a duplex communication channel in a single fiber using one carrier wavelength for receipt and transmission proved its operability and confirmed the achievement of the object stated herein.

The laboratory test bed comprised standard OADM/CWDM components as the wavelength division multiplexer and 50/50 splitters, and the system was simulated by fibers that introduced 0.32 and 0.35 dB losses and two 10 dB attenuators. Each attenuator was connected to the FC socket of the APC. The terminal equipment was connected to LC type sockets.

The tests were conducted for 4 duplex channels at 1310, 1330, 1350 and 1370 nm carrier wavelengths.

The test results are presented in the test report for the circuit for creating a duplex communication channel in a single fiber using one carrier wavelength for receipt and transmission, as shown in Table II, below:

TABLE II

| Measurement Section | Carrier (nm) | Right Arm (dB) | Left Arm (dB) | Active Equipment |
|---|---|---|---|---|
| Direct Loss | 1310 | −31.9 | −30.7 | SFP module |
|  | 1330 | −30.6 | −30.7 | (optical |
|  | 1350 | −30.2 | −30.1 | transmitter/optical |

TABLE II-continued

| Measurement Section | Carrier (nm) | Right Arm (dB) | Left Arm (dB) | Active Equipment |
|---|---|---|---|---|
|  | 1370 | −29.7 | −29.9 | receiver) |
| Reflection Loss | 1310 | −55.3 | −49.2 | Topaz-7105 |
|  | 1330 | −59.6 | −53.1 | (optical power |
|  | 1350 | −59.9 | −60.3 | meter) |
|  | 1370 | −55.8 | −50 |  |

Taking into account that the receiver sensitivity of the selected SFP modules is 40 dB, and their operability is guaranteed at a sensitivity of 37 dB (e.g., SFP 150 km Syoptec, 1 GB), these results prove the feasibility of creating duplex channels at each of the selected wavelengths in a single fiber to improve the utilization efficiency of the existing optic fiber and the spectral band.

Currently, approximately 50 communication channels created using this scheme are intensely used in the operator's network.

Figure 2:
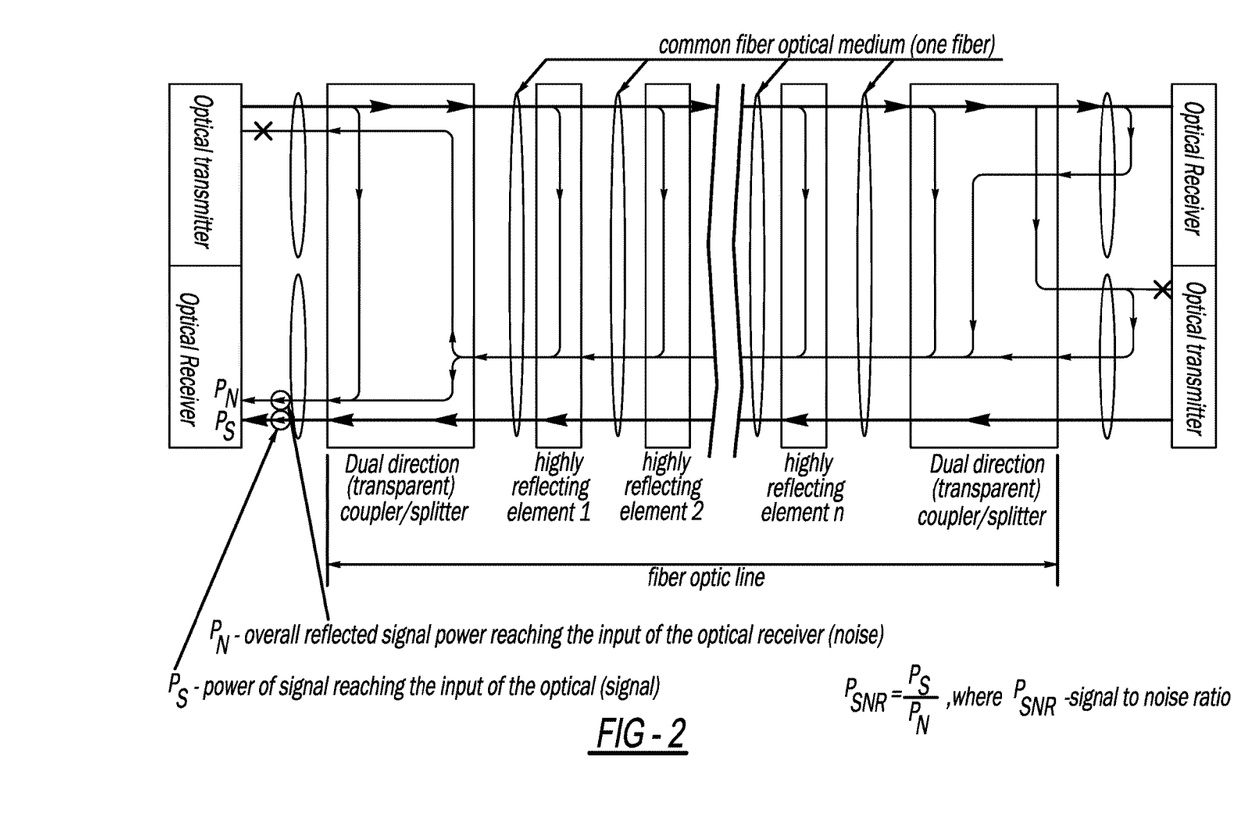
FIG. 2 shows an exemplary schematic of the passage of the reflected signals, in accordance with a first alternative embodiment of the present invention.

Referring specifically to FIG. 2, there is shown an exemplary schematic of the passage of the reflected signals, wherein:

the reflected power of a reflected signal represents that portion of the power of an optic signal, which after being reflected by components of the fiber-optic transmission line, is returned back, thus becoming an obstacle for the useful optic signal that has been transmitted;

the total reflected power of an optic signal represents the sum of all powers of the reflected signal at a certain point of the fiber-optic transmission line; and the total reflected power of an optic signal, which reaches the headend of the receiver, is the sum of all the powers of the reflected signal at the headend of the receiver.

Figure 3:
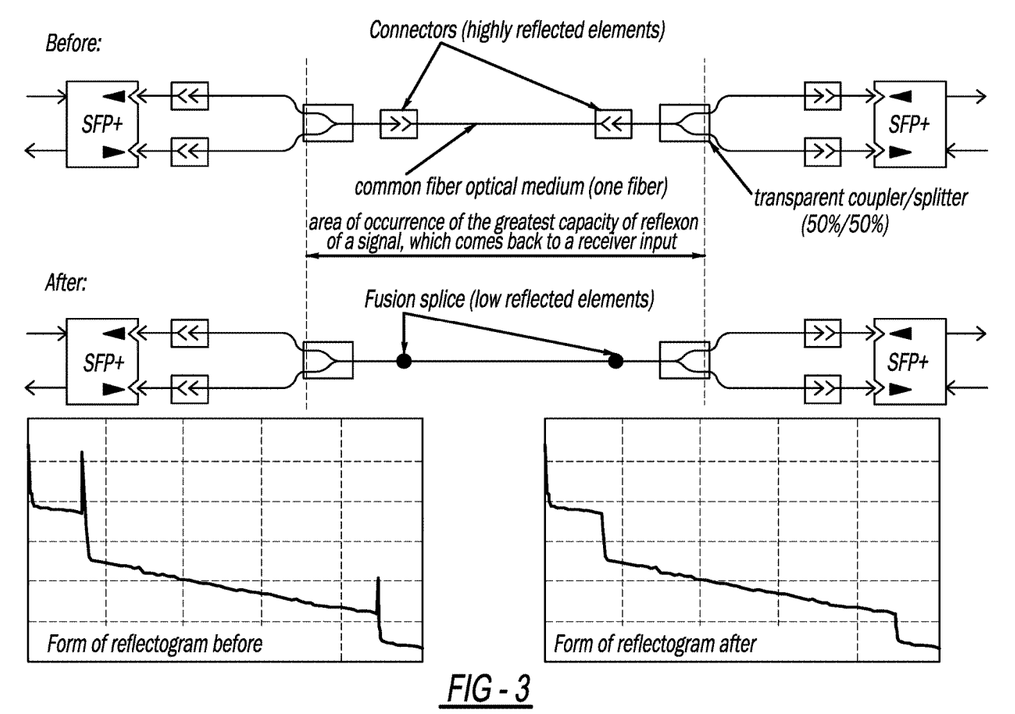
FIG. 3 shows an exemplary schematic of the working section of an existing fiber-optic communication network, in accordance with a second alternative embodiment of the present invention.

Referring specifically to FIG. 3, there is shown an exemplary schematic of the working section of an existing fiber-optic communication network. To reduce reflection to an acceptable level, it is sufficient to replace detachable optic connectors with one-piece welded connections (e.g., by welding splitters at the ends of the cables in the terminal devices prior to splicing the patch cords). It is also important to note that most CWDM/DWDM filters are characterised by a relatively low level of back reflection and that, consequently, introducing them with the use of welded joints is, in most cases, a sufficient means for making them suitable for simultaneous use with the methods of the present invention.

While the present invention has been described with reference to an exemplary embodiment, it will be understood by those skilled in the art that various changes can be made and equivalents can be substituted for elements thereof without departing from the scope of the present invention. In addition, many modifications can be made to adapt a particular situation or material to the teachings of the present invention without departing from the essential scope thereof. Therefore, it is intended that the present invention not be limited to the particular embodiment disclosed as the best mode contemplated for carrying out this present invention, but that the present invention will include all embodiments falling within the scope of the appended claims.

What is claimed is:

1. A method of transmitting an optical data signal via a fiber optical medium in opposite directions at a same carrier wavelength, comprising the steps of:

providing a fiber-optical line, terminated with transparent bidirectional signal dividers intended for an input/output of optical data signals to or from the fiber-optical line, an optical receiver and an optical transmitter, optically connected to the fiber-optical line via the transparent bidirectional signal dividers at opposite sides;

measuring or calculating a value of an overall reflected signal power reaching an input of the optical receiver for a specific optical communication system;

comparing the value of the overall reflected signal power with a selected maximum noise power acceptable for data signal extraction by the optical receiver; and lowering the overall reflected signal power of the reflected signal reaching the input of the optical receiver to a selected level that is acceptable for separating a target optical signal from an overall optical signal reaching the input of the optical receiver by excluding highly reflecting elements in a path of the optical data signal between the optical transmitter and the optical receiver, and, as a result, transmission of the optical data signal is achieved in the opposite directions at the same carrier wavelength for the specific optical communication system;

wherein the method is used in combination with a wavelength division multiplexing method;

wherein the wavelength division multiplexing method is selected from wavelength division multiplexing, coarse wavelength division multiplexing, and dense wavelength division multiplexing;

wherein the fiber is homogeneous;

wherein the fiber-optical medium comprises a plurality of wavelength bands, wherein transmission of at least one wavelength band is achieved in two opposite directions.

2. The method of claim 1, wherein the steps are performed as a preliminary step before implementation of a further transmission.

3. The method of claim 1, wherein the steps are performed during the transmission of the optical data signal.

4. The method of claim 1, wherein the fiber-optical line comprises passive optical elements.

5. The method of claim 1, wherein a power of a signal reflected from an opposite end of the specific optical communication system is neglected in a calculation of the overall reflected signal power.

6. The method of claim 1, wherein the transmitter and the receiver operate at the same carrier wavelength.

7. A method of transmitting an optical data signal via a fiber optical medium in opposite directions at a same carrier wavelength, comprising the steps of:

providing a fiber-optical line, terminated with transparent bidirectional signal dividers intended for an input/output of optical data signals to or from the fiber-optical line, an optical receiver and an optical transmitter, optically connected to the fiber-optical line via the transparent bidirectional signal dividers at opposite sides;

measuring or calculating a value of an overall reflected signal power reaching an input of the optical receiver for a specific optical communication system;

comparing the value of the overall reflected signal power with a selected maximum noise power acceptable for data signal extraction by the optical receiver; and lowering the overall reflected signal power of the reflected signal reaching the input of the optical receiver to a selected level that is acceptable for separating a target optical signal from an overall optical signal reaching the input of the optical receiver by replacing highly reflecting elements in a path of the optical signal with lower reflecting elements, and, as a result, transmission of the optical data signal is achieved in the opposite directions at the same carrier wavelength for the specific optical communication system;

wherein the method is used in combination with a wavelength division multiplexing method;

wherein the wavelength division multiplexing method is selected from wavelength division multiplexing, coarse wavelength division multiplexing, and dense wavelength division multiplexing;

wherein the fiber is homogeneous;

wherein the fiber-optical medium comprises a plurality of wavelength bands, wherein transmission of at least one wavelength band is achieved in two opposite directions.

8. The method of claim 7, wherein the steps are performed as a preliminary step before implementation of a further transmission.

9. The method of claim 7, wherein the steps are performed during the transmission of the optical data signal.

10. The method of claim 7, wherein the fiber-optical line comprises passive optical elements.

11. The method of claim 7, wherein a power of a signal reflected from an opposite end of the specific optical communication system is neglected in a calculation of the overall reflected signal power.

12. The method of claim 7, wherein the transmitter and the receiver operate at the same carrier wavelength.

13. A method of transmitting an optical data signal via a fiber optical medium in opposite directions at a same carrier wavelength, comprising the steps of:

providing a fiber-optical line, terminated with transparent bidirectional signal dividers intended for an input/output of optical data signals to or from the fiber-optical line, an optical receiver and an optical transmitter, optically connected to the fiber-optical line via the transparent bidirectional signal dividers at opposite sides;

measuring or calculating a value of an overall reflected signal power reaching an input of the optical receiver for a specific optical communication system;

comparing the value of the overall reflected signal power with a selected maximum noise power acceptable for data signal extraction by the optical receiver; and lowering the overall reflected signal power of the reflected signal reaching the input of the optical receiver to a selected level that is acceptable for separating a target optical signal from an overall optical signal reaching the input of the optical receiver by redistributing highly reflecting elements in a path of the optical signal between the optical transmitter and the optical receiver, and, as a result, transmission of the optical data signal is achieved in the opposite directions at the same carrier wavelength for the specific optical communication system;

wherein the method is used in combination with a wavelength division multiplexing method;

wherein the wavelength division multiplexing method is selected from wavelength division multiplexing, coarse wavelength division multiplexing, and dense wavelength division multiplexing;

wherein the fiber is homogeneous;

wherein the fiber-optical medium comprises a plurality of wavelength bands, wherein transmission of at least one wavelength band is achieved in two opposite directions.

14. The method of claim 13, wherein the steps are performed as a preliminary step before implementation of a further transmission.

15. The method of claim 13, wherein the steps are performed during the transmission of the optical data signal.

16. The method of claim 13, wherein the fiber-optical line comprises passive optical elements.

17. The method of claim 13, wherein a power of a signal reflected from an opposite end of the specific optical communication system is neglected in a calculation of the overall reflected signal power.

18. The method of claim 13, wherein the transmitter and the receiver operate at the same carrier wavelength.

* * * * *